Jan. 14, 1964  J. R. OISHEI ETAL  3,117,335
WINDSHIELD WIPER SYSTEM
Filed June 27, 1963  4 Sheets-Sheet 1

INVENTOR.
JOHN R. OISHEI,
RAYMOND A. DEIBEL
BY and MARTIN BITZER

E. Herbert Liss
ATTORNEY.

INVENTOR.
JOHN R. OISHEI,
RAYMOND A. DEIBEL
BY and MARTIN BITZER

E. Herbert Liss
ATTORNEY.

United States Patent Office 3,117,335
Patented Jan. 14, 1964

3,117,335
WINDSHIELD WIPER SYSTEM
John R. Oishei, Buffalo, Raymond A. Deibel, Cheektowaga, and Martin Bitzer, Kenmore, N.Y., assignors to Trico Products Corporation, Buffalo, N.Y.
Filed June 27, 1963, Ser. No. 292,201
21 Claims. (Cl. 15—250.12)

The present invention relates to a windshield wiper system for use with rotary motors and, more particularly, to a windshield wiper system of the type in which the wiper remains parked during a portion of each cycle of wiper operation.

This application is a continuation in part of application Serial No. 286,567, filed June 10, 1963, now abandoned.

Under certain road conditions, such as light rain or wet roads, where splash-back from a vehicle creates a wet-dry condition on the windshield of a motor vehicle, continuous windshield wiper operation may cause smearing and obscure the vision of the driver. Under such conditions the wiper element may be inadequately lubricated, causing undue wear on the wiper blade as well as hazardous vision conditions. To overcome these problems, it is desirable to provide a windshield wiper system in which the wiper remains in the parked position for an interval of time after a wiping operation and then automatically resumes wiper operation, thus automatically providing windshield wiping with intermittent dwell periods. During these intermittent dwell periods, the windstream against the windshield due to vehicle motion can be employed advantageously to dry and dissipate the thin film of vision obscuring moisture which is created by wiper operation on a wet-dry windshield. This intermittent dwell type of operation also reduces windshield wiper wear in two ways:

(1) The wiper is operating on the wet-dry windshield only a portion of the time rather than continuously.

(2) Sufficient time between wiping operations elapses to permit accumulation of a sufficient amount of water droplets on the windshield to provide adequate lubrication for the blade.

Systems of this type are known which utilize thermal responsive switch elements for disconnecting the motor from its power source at predetermined intervals. Such systems are responsive to current flow in the electrical network of the motor. Voltage and current in the circuitry of such a network varies with the load on the electrical system of the vehicle and may cause erratic operation of the thermal switch due to current variations in the heating element. Furthermore, there are wide variations in ambient temperature of the environment in which such a switch is disposed which will further affect its operation. Other types of intermittent wiper systems are known which utilize pneumatic or solenoid operated circuit interrupting devices which overcome the objections to a thermal switch. An example of such a system is shown and described in application Serial No. 169,318 by John R. Oishei et al., filed January 29, 1962. However, in some applications it is desirable to provide a compact and simplified intermittent wiper system which avoids dependence upon the electrical system or vacuum system of the motor vehicle.

It is, therefore, the principal object of the present invention to provide a simplified timing control for interrupting wiper motor operation which is actuated by the wiper motor itself.

Another object of the invention is to provide an improved simplified wiper interrupting timer actuated by the wiper transmission mechanism which includes pneumatically controlled dwell timing.

Another object of the invention is to provide an improved simplified wiper interrupting device operated by the wiper transmission to effect wiper dwell in which the dwell period can be manually adjusted from a remote position.

A further object of the invention is to provide an improved simplified, mechanically controlled dwell timer which is actuated by engagement with a wiper transmission, but in which the engaging parts can be retained out of engagement during continuous wiper operation.

Another object of the invention is to provide an improved simplified timing control for periodically interrupting wiper motor operation which is actuated by the wiper transmission mechanism.

A still further object of the invention is to provide an improved simplified timing control for periodically interrupting wiper motor operation which is actuated by the wiper transmission mechanism and may be located remotely and independent of the motor.

Other objects and advantages of the invention will be apparent from the following detailed description taken in conjunction with the accompanying drawings in which.

Briefly, the invention comprises a rotary wiper motor which may be an electric motor, including a gear reduction unit, the output of which drives a pair of windshield wipers through suitable linkage and other motion transmission elements. Operatively engaging the gear reduction unit, the linkage, or the other motion transmission elements, is a combined timer and circuit interrupter forming a dwell control. The circuit interrupter includes a stationary contact and a movable contact which is operated by a plunger type operator. The plunger operates within a housing which is divided into compartments by a diaphragm secured to the plunger by suitable means. The free end of the plunger extends into the housing of the gear reduction unit and is engageable with a projection on the driving gear, which projection actuates the plunger to move the contacts to open position. Other movable elements of the wiper transmission may include a plunger engaging part in lieu of the projection on the driving gear, which plunger engaging part actuates the plunger. A spring is provided which acts on the diaphragm to bias it in a direction to carry the operating rod or plunger to a position where the contacts are closed. Return of the plunger to the contact "on" position is retarded by the pressure differential created on opposite sides of the diaphragm as the plunger is drawn to the contact "off" position by expulsion of air or drawing of air through a check valve as the diaphragm moves with the plunger. A bleed is provided to a compartment on one side of the diaphragm to permit return or expulsion of air to the housing at a controlled rate as the spring returns the diaphragm to its initial position. When the pressure becomes substantially equal on opposite sides of the diaphragm, the plunger is returned to the contact "on" position and is again in position to be engaged by the projection on the driving gear or by engagement with a suitable transmission element.

The wiper motor control includes a three-position switch which includes an "off" position, a continuous operation position whereby the timer contacts are by-passed and an intermittent operation position which places the timer contacts in the wiper motor circuit. The dwell can be controlled by adjustment of a needle valve in the bleed passage. During continuous operation the plunger can be maintained out of contact with the associated transmission element either by a vacuum hold retaining the diaphragm in a position to hold the plunger away from the transmission element or by a Bowden cable which mechanically moves the plunger to an inoperative position.

Figure 1:
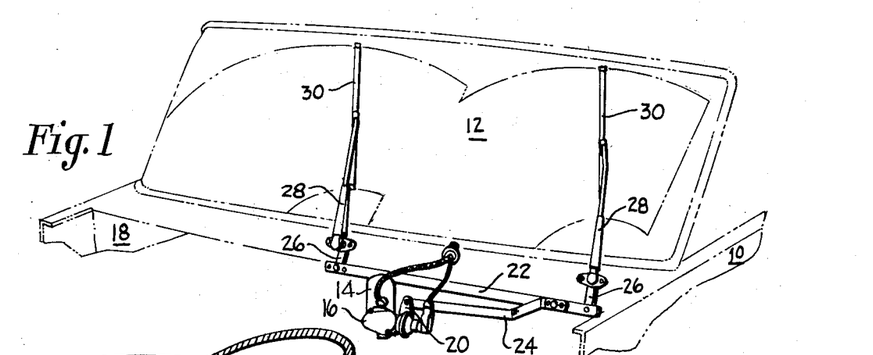
FIG. 1 is a partial perspective view of a motor vehicle embodying the instant invention.

In FIG. 1 an automotive vehicle 10 is shown having a windshield 12 mounted thereon in a conventional manner. A windshield wiper motor 14 having a gear reducer 16 is mounted on the fire wall 18 of the vehicle. The gear reducer has a crankarm 20 operatively coupled thereto. An elongated link 22 is pivotally secured to the crankarm 20 through a second elongated link 24. Opposite ends of the link 22 are connected to crankarms 26 mounted at the inner ends of rockshafts or pivot shaft 27 (FIGS. 9 and 10) which are journaled in the cowl of the vehicle and have wiper arms 28 mounted at their outer ends. The wiper arms each carry wipers 30. When the wiper motor 14 is energized, the wipers 30 will be oscillated across the windshield to clear moisture therefrom. The gear reducer 16, crankarms 20 and 26, links 22 and 24, and the rockshafts constitute the wiper transmission means.

The wiper circuit (FIG. 7) includes a battery 32 or other suitable source of power. When the switch 34 is in position "a," no current can flow to the motor 14 and the wipers are parked. When the switch is moved to position "b," continuous energization of the wiper motor is provided by battery 32 through switch 34 to conductor 36, through armature 40 and field winding 46 of motor 14 and conductor 42 to ground. When the switch 34 is moved from position "b" to position "a" or "off," the circuit is maintained through conductor 48 and parking switch 52 to the motor 14. When the motor armature reaches the parked position, a cam 53 on the motor shaft will open the parking switch 52. When the switch is moved to position "c," current flows from the battery 32 through switch 34, conductor 50, timer contacts 54, conductor 56, and conductor 36 to the motor 14 and from the motor to ground. Thus, when the timer actuates the contacts 54 to open position, the motor 14 will be de-energized when the parking switch 52 is moved to its open position and when the contacts 54 reclose, the motor will be restarted. This circuit is to be understood as exemplary. It will, of course, be understood that in accordance with the broader aspects of the invention, other and different types of circuitry may be employed, including dynamic braking.

Figures 2, 3, 4:
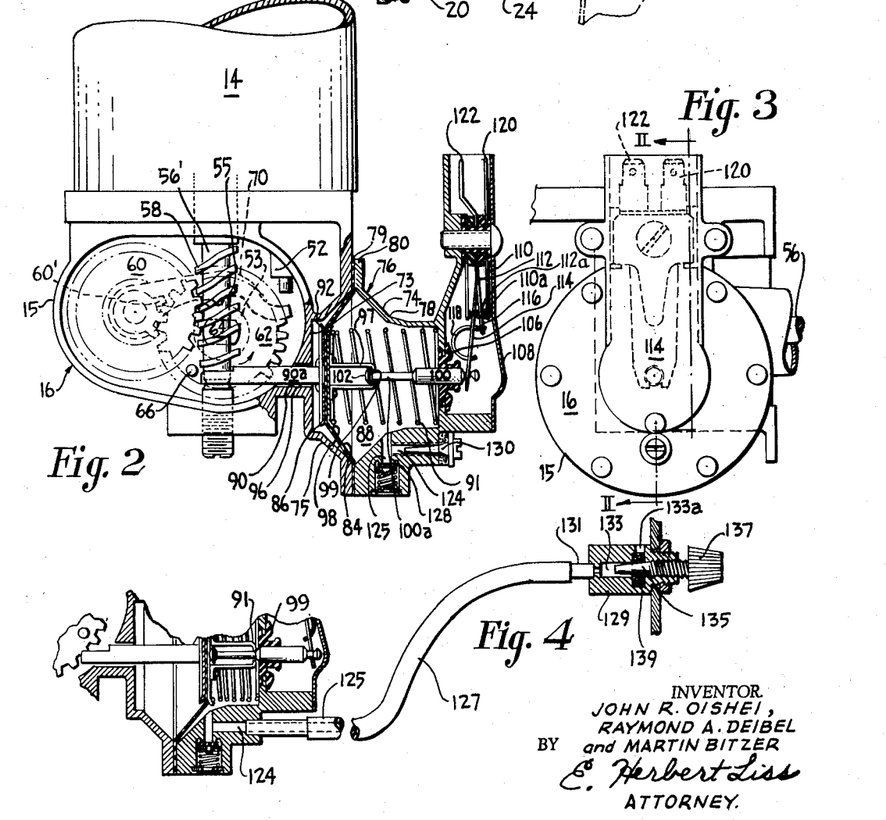
FIG. 2 is a sectional view taken on line II—II of FIG. 3.
FIG. 3 is a side elevational view.
FIG. 4 is a cross sectional view of the timer of this invention illustrating its use with a remote manually controllable dwell period adjusting mechanism.

The gear reduction unit includes a housing 15 having motor shaft 56' extending therein. The end 55 of motor shaft 56' within the housing has thereon a worm 58 which drives worm gear 60. Mounted concentrically with worm gear 60 is a pinion 60' of smaller diameter than worm gear 60. Pinion 60', in turn, engages driving gear 62 to which the output shaft 64 is secured for rotation therewith. Crankarm 20 is secured to the shaft 64. An axially extending projection or stud 66 is secured to driven gear 62 adjacent the circumference thereof. A cam 53 is provided on the output shaft 64 for engagement with lever 70 which actuates parking switch 52. The cam is designed to actuate the parking switch 52 through lever 70 when the wipers 30 are in position against the lower windshield molding. The housing 15 of the gear reducer 16 includes a recessed portion 73 which forms a section 75 of the housing 74 of timer 76. Timer 76 includes a second housing section 78 having an annular flange 80 which conforms to an annular flat surface 79 surrounding the recess 73 of the gear reducer housing 15 and is secured thereto in any suitable manner as, for example, by bolts 82. A resilient flexible diaphragm 84 is sandwiched between the annular flange 80 and the annular flat surface 79 surrounding the recess 73 forming a chamber 86 on the left side of the diaphragm, as seen in FIG. 2, and a chamber 88 on the right side of the diaphragm 84.

Secured to the flexible diaphragm 84, preferably centrally thereof, is a plunger rod assembly 90. A plunger rod 90a is secured to the diaphragm by a plate 92 with rivets 94 or other suitable fastening means and extends centrally through chamber 86 and a central opening 96 in recess 73 into the gear reducer housing 15. The free end of the rod 90a is positioned to be engaged by projection 66 on gear 62 to thereby effect movement of the rod 90a and diaphragm 84 to the right from the position shown in FIG. 2 to the position shown in FIG. 4. A spring 91, which may be a compression spring as shown, is disposed in chamber 88 which bears on end wall 93 of housing section 74 at one end and at its other end bears against a plate 98 secured to the diaphragm 84 on the side opposite the rod 90a in plate 92. The spring 91 is provided to bias the diaphragm and plunger rod 90a to the left from the position shown in FIG. 4 to the position shown in FIG. 2. Thus the diaphragm and plunger rod is actuated in one direction by the projection 66 and is returned in the opposite direction by spring 91.

Secured to the side of the flexible disc or diaphragm 84 opposite the rod 90a by the plate 98 is a hollow tubular rod-like member 97 having a central opening at its free end which receives a plunger rod or switch operator 100 slidable therein to provide a lost motion connection between the diaphragm 84 and the timer switch operator 100. The portion 100a of the operator 100 which is slidable within the hollow tubular member 97 is of reduced diameter to provide sufficient clearance with the opening 99 in the end of the tubular member 97 to permit free sliding motion. The reduced diameter portion 100a has an enlarged head portion 102 at its free end which engages the end wall of the tubular member 97 when moving in one direction and a shoulder 104 intermediate its ends formed by the reduced diameter portion 100a to engage the end wall of the hollow tubular member 97 when moving in the opposite direction. The operator 100 extends through a gland seal 106 disposed in a central opening in the end wall of housing section 75 of housing 74 and projects outwardly therefrom into the timer switch housing 108.

Disposed within the timer switch housing 108 is a stationary contact arm 110 carrying a stationary contact 110a and a movable contact assembly 112 comprising a movable contact arm 116 which carries a movable contact 112a. A movable contact arm actuator 114 connects the movable contact arm 116 with the operator 100 through an over-center spring device 118. The operator 100 is connected to the actuator 114 for movement therewith in any suitable manner as, for example, by a bifurcated end portion of the actuator receivable on a reduced neck portion of the rod 100. Thus the switch is rapidly snapped from open to closed position with movement of the diaphragm 84 and operator 100. The lost motion connection between the diaphragm 84 and the operator 100 is provided to compensate for the difference in axial movement of the diaphragm 84 when projection 66 engages rod 90a and the movement required to actuate the switch from open to closed position. Although a particular lost motion connection has been shown and described for the purpose of illustration, it will of course be obvious, that in accordance with the broader aspects of this invention, any suitable type of lost motion connection between the diaphragm and the actuator 114 may be employed or the assembly may be so designed that the travel of the diaphragm is equivalent to the travel of the switch, in which case the lost motion connection may be eliminated. The contact arms 110 and 116 include terminals 120 and 122, respectively, adapted to be connected to conductors 56 and 50, respectively.

Conduits 124 and 125 are provided in housing section 78 of timer housing 74 which communicate between the atmosphere and chamber 88. A check valve 128 is provided in conduit 125 to permit expulsion of air from chamber 88 when the diaphragm is moved to the right, as seen in FIG. 2, and to prevent entrance of atmospheric pressure to chamber 88. Conduit 124 has seated therein a metering valve member 130 which is adjustable to provide a bleed for permitting controlled entry of atmosphere to chamber 88.

The operation of the motor timer should now be apparent. When the switch 34 is moved to position "c" for intermittent wiper operation, the contacts 112 and 112a of the switch are closed and a circuit is established from the battery through switch 34, conductor 50, switch 54, conductor 56, conductor 36 to the motor, thence to ground, initiating rotary motor operation causing driving gear 62 to rotate in the direction of the arrow. When the protuberance 66 engages rod 90a during the first cycle of operation, the rod 90a drives the diaphragm and the operator 100 to the right to the position shown in FIG. 4, compressing spring 91 and effecting opening of contacts 112 and 112a of timer switch 54, opening the intermittent circuit. However, the wiper motor circuit remains closed through conductor 48 and parking switch 52 until such time as the cam 53 causes parking switch 52 to open, thus halting motor operation. The diaphragm 84, having moved to the right as seen in FIG. 4, reduces the volume of chamber 88 and drives air out through check valve 128. Thus the pressure in chamber 86 is sufficiently greater than the pressure in chamber 88 to overcome the spring bias provided by spring 91 tending to cause diaphragm 84 to move to the left. The controlled bleed through conduit 124 permits entry of air to chamber 88 at a controlled rate, thus permitting spring 91 to return diaphragm 84 and plunger 90a to the position where plunger 90a is engageable with protuberance 66, as seen in FIG. 2. When the diaphragm returns to this position, the timer switch 54 is returned to its "on" position and the motor is reenergized. The duration of time during which the motor is deenergized and during which the wipers remain parked is controlled by the rate of air influx through conduit 124. When the motor restarts, the gear 62 and its projection 66 again rotate until the projection 66 again engages the plunger 90a to initiate another dwell period. The projection 66 and the cam 53 for actuating of the parking switch 52 are so disposed with respect to each other that the timer switch 54 is opened before the parking switch 52 to assure proper parking of the wiper blades and to permit projection 66 to move out of the path of the plunger 90a so that the plunger may make a full return to its innermost position, thereby permitting actuation of timer switch 54.

When it is desired to operate the wiper continuously, the switch is placed in the "b" position thus bypassing the timing device and timer switch 54. This results in continuous operation of the wiper. On the first cycle of continuous wiper operation, the plunger 90a actuates the diaphragm 84 and the operator 100. A number of cycles of wiper operation take place before the plunger 90a again returns to the position shown in FIG. 2 where it again engages projection 66 of gear 62. However, due to the lost motion connection between diaphragm 84 and operator 100, rod 90a returns to engaging position with projection 66 prior to actuation of the movable contact assembly 112. Thus although projection 66 drives the plunger 90a and diaphragm 84 to the right as seen in FIG. 2 each time the projection 62 engages the rod 90a, it does not repeatedly actuate the switch.

In FIG. 4 there is illustrated a modification of the timer mechanism of the present invention which is identical in all respects to the above described FIG. 2 modification except for a change in the structure of the bleed conduit 124. For sake of brevity and clarity, identical reference numerals will be used for identical parts and only the bleed will be described. Conduit 124 includes a nipple 125 to which is connected a conduit 127 leading to a bleed housing 129 located on the dash panel of a vehicle or at any other suitable position within convenient reach of the operator. The bleed housing 129 includes a nipple 131 to which conduit 127 is connected, leading to a bleed conduit 133 in which is threaded a metering valve element 135 having a control knob 137. In this modification, the operator may, by turning the control knob 137, adjust the bleed rate for permitting re-entry of air to chamber 88 through atmospheric conduit 133a, filter 139, conduit 133, nipple 131, conduit 127, nipple 125 and conduit 124. Opening of the conduit 133 by backing off the threaded valve stem 137 will result in faster return of air to chamber 88, thus decreasing the length of the dwell period.

Figure 5:
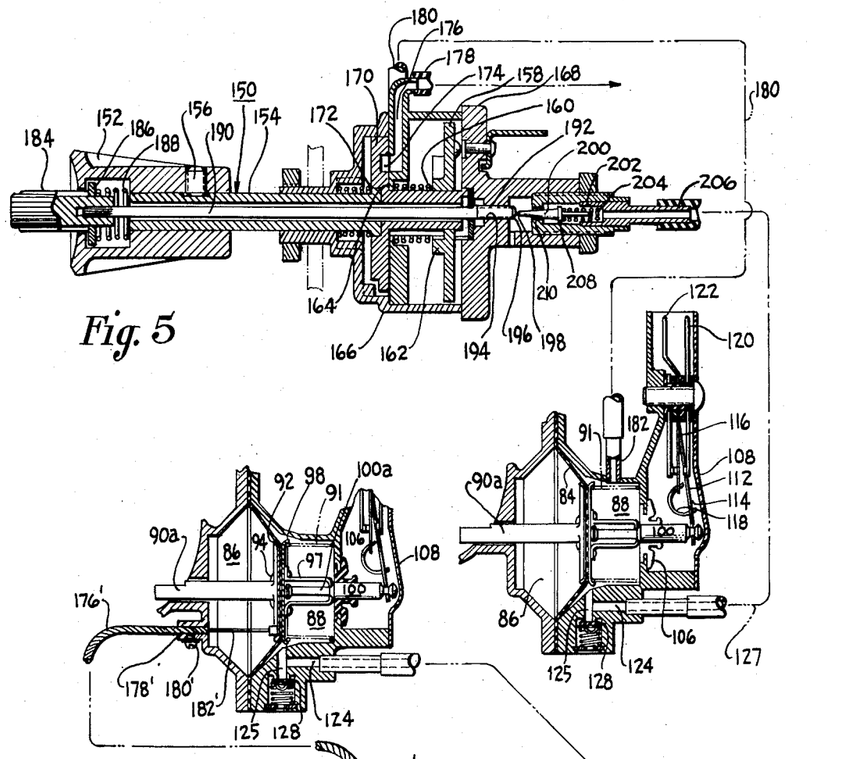
FIG. 5 is a sectional view of one embodiment of the invention illustrating the control switch and timer.

Another modification of the wiper system of this invention is shown in FIG. 5. The modification illustrated in FIG. 5 discloses a vacuum hold means for maintaining the plunger rod 90a out of engagement with the projection 66 on the driving gear 62 during continuous operation. This modification also includes remotely mounted manual means similar to the FIG. 4 modification adjustable by the vehicle operator to vary the duration of dwell to suit road and weather conditions by varying the position of a metering valve element. In accordance with the broader aspects of the invention, one or both of these features may be utilized in connection with the wiper system of this invention. The combined timing device and circuit interrupter shown in FIG. 5 is identical in construction with that shown in FIGS. 2 and 3 except for the provision of a vacuum conduit communicating with chamber 88 of the timer control device and the bleed conduit and connection thereto which is identical to the FIG. 4 modification.

Figure 7:
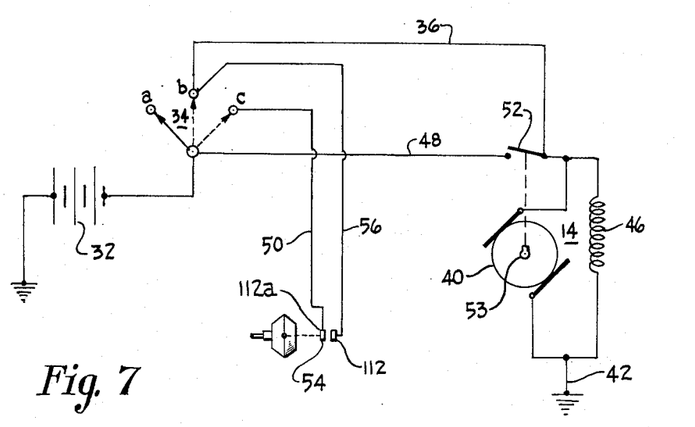
FIG. 7 is a circuit diagram of a wiper system embodying the invention.

In this form of the invention, a manual control 150 is provided for selective manipulation by the vehicle operator. This control is used for either causing the wiper to operate intermittently, continuously, or to shut it off. Control 150 includes a control knob 152 which is in engagement with the shaft 154 through set screw 156. The rotation of knob 152 will cause a corresponding rotation of movable contactor plate 158 which is mounted on the end thereof opposite the knob 152 for rotation with shaft 154. A spring 160 which is interposed between the hub 162 of contactor plate 158 and shoulder 164 in housing 166 biases movable contactor plate 158 to the right to effect good electrical connection with stationary contactor plate 168 which is secured to the housing 166. Rotation of knob 152 to a predetermined detent position will effect continuous wiper motor operation. The rotation of knob 152 to another predetermined position will effect intermittent wiper motor operation. When the knob 152 is rotated to effect continuous operation, valve element 170 which is pressed onto shoulder 172 of shaft 154 has a groove 174 which bridges aperture 176 in communication with conduit 178 and an aperture, not shown, in communication with conduit 180. Conduit 178 is in communication with a source of vacuum as, for example, an engine intake manifold, and conduit 180 is in communication with nipple 182 in communication with chamber 88 of the timer device. When the knob 152 is rotated to place the movable contacts on contact plate 162 in position "b" (FIG. 7) for continuous operation, vacuum is supplied to chamber 88 which draws diaphragm 84 and plunger rod 90a to the right to the position shown in FIG. 5 which is out of engagement with projection 66 on gear 62. On rotation of knob 152 to position "c," as shown in FIG. 7, for effecting intermittent operation, the groove 174 will no longer bridge the aperture 158 leading to conduit 178 and the aperture leading to conduit 180 and the vacuum applied to chamber 88 will be interrupted. Air will be admitted to chamber 88 through conduit 124, thereby returning the plunger to its operative position for intermittent operation.

The length of dwell between successive cycles of wiper operation can be adjusted by the vehicle operator by manipulating knob 184 of manual control 150. A shoulder 186 is fixed to the end of knob 184 and is housed within chamber 188 of knob 152. A shaft 190 has one end thereof fixedly secured to knob 184 and the other end thereof threaded at 192 for mating engagement with tap bore 194 in stationary contact plate 168. The rotation of knob 184 therefore results in axial movement of shaft 190 and the end 196 of this shaft abuts the end 198 of metering pin 200 which is biased to the left by spring 202 which is interposed between shoulder 204 in nipple 206 and collar 208 on metering pin 200. The metering pin is tapered, as indicated, so that by moving this tapered portion relative to cylindrical bore 210 the rate of air flow through bore 210 can be controlled to thereby determine the length of time which it takes for diaphragm 84 to return to the position shown in FIG. 2. Thus, the vehicle operator by a simple operation can adjust the period of dwell between successive cycles of wiper operation to fit the precise conditions of precipitation in which he is driving.

Figure 6:
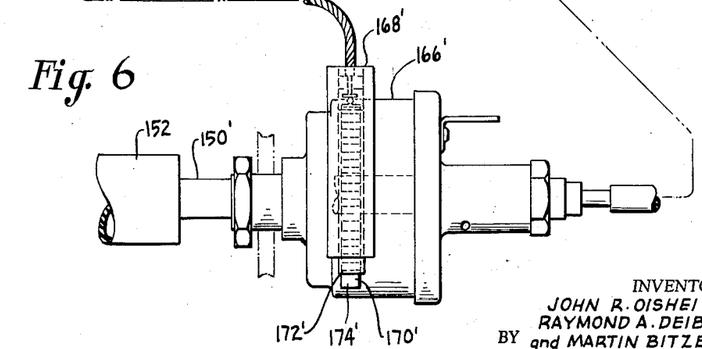
FIG. 6 is a schematic view of the wiper system of this invention illustrating the timer in cross section and a modified form of control switch.

Yet another modification of the invention is shown in FIG. 6 in which a mechanical device is provided for maintaining the plunger 90a out of engagement with projection 66 on driving gear 62 during continuous operation. In this modification, a manual control is employed similar to the manual control of FIG. 5, but utilizing a rack and pinion arrangement for actuating a Bowden cable rather than utilizing the vacuum hold of the FIG. 5 modification. Secured to the shaft 154 in any suitable manner within the housing 166' of the manual control 150' is a pinion 170'. A rack housing 168' may be mounted on the housing 166' which has a rack 172' slidable therein. The teeth of pinion 170' extend through a slot 174' in housing 166' and engage rack 172'. Rotation of pinion 170' effects movement of rack 172'. Secured to the rack housing 168' is one end of the sheath of a Bowden cable 176'. The other end of the Bowden cable sheath is received in opening 178' in timer control housing 75. Bowden cable 176' may be retained in position in opening 178' by a set screw 180' as shown or by other suitable means. The movable wire element 182' of the Bowden cable is secured at one end to rack 172' and is engageable with plate 92 on diaphragm 84 at its other end. When knob 152 is rotated to effect closing of the contacts at "b" for continuous wiping operation, the Bowden cable 176' is actuated by rotation of pinion 170' and movement of rack 172' to engage plate 92 on diaphragm 84 and to drive diaphragm 84 together with rod 90a to the position seen in FIG. 6. In this position rod 90a is maintained out of engagement with the projection 66, thereby reducing wear on the timer control and circuit interrupter during continuous operation. Although this embodiment is illustrated utilizing the Bowden cable, rack and pinion, it will of course be understood that in accordance with the broader aspects of the invention, any suitable or desirable means may be employed to retain the rod 90a out of engagement with the projection 66 and such mechanical means may be coordinated with the control switch operation. For example, the Bowden cable may be connected to operator 100 by a lost motion connection.

Figure 8:
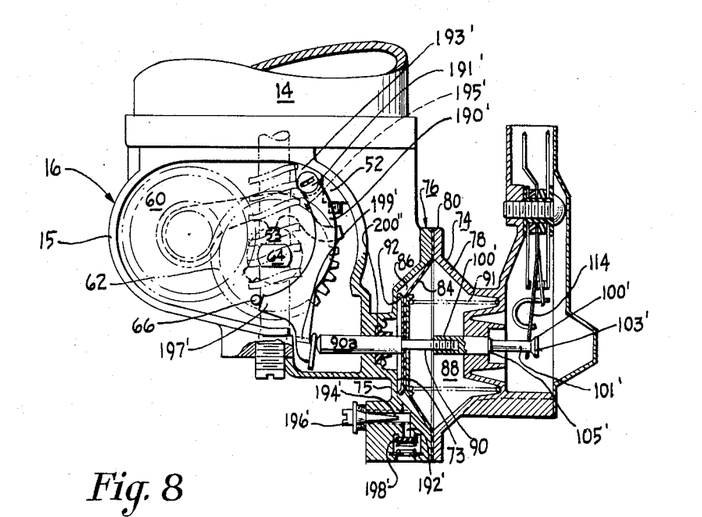
FIG. 8 is a view similar to FIG. 2 illustrating another embodiment of the invention.

Another embodiment of the invention is illustrated in FIG. 8 wherein a pivotal lever 190' is provided in the gear reducer housing for engagement with projection 66 and which, in turn, engages plunger rod 90a. In FIG. 8 an atmospheric opening 192' and a bleed opening 194' are shown in communication with chamber 86 rather than with chamber 88. Bleed opening 194' includes a metering valve 196' and atmospheric opening 192' includes a check valve 198'. The lost motion connection shown in FIG. 2 between the operator 100 and the diaphragm 84 is replaced in FIG. 8 modification by a threaded connection between rod 90a and an operator 100'. A lost motion connection is provided instead between contact actuator 114 and operator 100'. This is accomplished by including a lengthened neck portion 101' adjacent the free end of operator 100' which slidably engages the bifurcated end of contact actuator 114 and travels between headed end 103' of operator 100' and shoulder 105' which delineates the reduced neck portion 101' from the remainder of the operator 100'.

The gear reducer structure is identical to that shown in FIG. 2, but includes, in addition, the lever 190' pivoted at 191' to a boss 193' on the gear reducer housing. The lever 190' includes a cam surface 195' in which projection 66 rides, an arm 197' for engagement with projection 66 and an arm 199' for engagement with plunger rod 90a.

In operation as the gear 62 rotates, projection 66 engages arm 197' to drive the lever arm 199' into engagement with the plunger rod 90a. The projection 66 then rides on the cam surface 195'. As the plunger rod 90a is moved to the right, it carries the diaphragm 84 therewith, expanding the volume of chamber 86, thereby drawing air through the check valve 198' and opening or conduit 192' into the chamber 86. Thus the pressure in chamber 86 is greater than the pressure in chamber 88 and is sufficient to impede the biasing action of spring 91. When the spring is compressed and tends to return the diaphragm 84 to the position seen in FIG. 8, air is forced out of chamber 86 at a controlled rate through bleed conduit 194', thus controlling the rate at which the diaphragm returns to the position seen in FIG. 8, thereby controlling the time which the circuit interrupter contacts are open. A gland seal 200'' is provided in opening 96 through which plunger rod 90a projects into the gear reducer housing to provide a substantial air-tight compartment 86.

Figure 9:
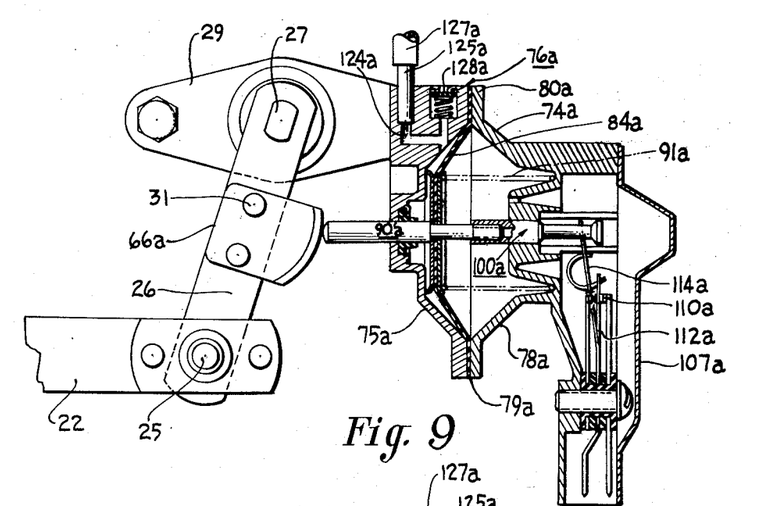
FIG. 9 is a view partly in section illustrating a preferred embodiment of the invention.
Figure 10:
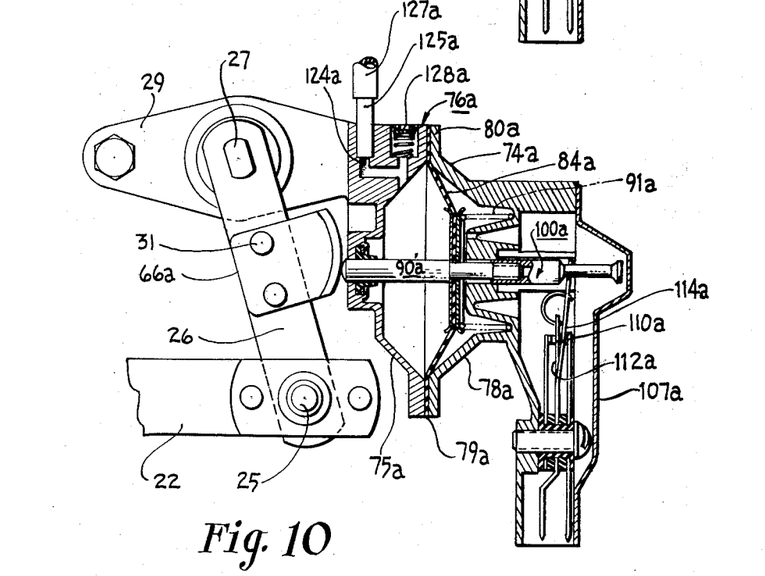
FIG. 10 is a view similar to FIG. 9 illustrating the embodiment shown in a different portion of the operating cycle.

One of the preferred embodiments of the invention is illustrated in FIGS. 9 and 10. Utilization of this embodiment permits use of any suitable or desirable rotary wiper motor which may be of conventional design and construction and requires no alteration thereto. The combined cyclic timer and timer switch 76a may be located remote from the wiper motor and gear reduction unit, if desired, and may be operated by any movable element in the wiper transmission including the wiper pivot shaft or any linkage or arms connected thereto.

In FIGS. 9 and 10, link 22 is shown pivotally secured to crankarm 26 by a suitable pivot as at 25. At its other end, crankarm 26 is secured to rockshaft or pivot shaft 27 for rotation therewith. Rockshaft 27 is suitably journaled in a bracket 29 for rotation therein. The bracket 29 may be secured to the body portion of a vehicle adjacent the lower end of the windshield in any suitable manner. Secured intermediate the ends of the crankarm 26, as by rivets 31, or in any other suitable or desirable manner as, for example, welding, is a cam segment 66a. Secured to the bracket 29 either integral therewith as shown or rigidly mounted thereon is housing portion 75a of cyclic timer 76a.

The cyclic timer 76a and its associated timing switch is substantially the same as the timer 76 shown in FIG. 8 and will not be described in detail except for those portions and elements which differ from the timer 76 shown in FIG. 8. Corresponding parts will be identified by like reference numerals suffixed by the letter "a." The housing portion 75a includes an annular flange or flat surface 79a to which is secured the flange 80a of housing section 78a forming timer housing 74a. A resilient flexible diaphragm 84a has its annular edge sandwiched between the annular flange 80a and the annular flange 79a. The bleed opening 124a is shown connected by nipple 125 to conduit 127a for connection to a bleed adjustment control which may be in the form shown in FIG. 4 or the form shown in FIG. 5. It should also be understood that this conduit may be omitted and a metering valve may be employed as shown in FIG. 8. The remainder of the structure of the cyclic timer 76a may be identical with the construction shown in FIG. 8. It should also be understood that the construction of the timer 76a may be identical with the construction shown in FIG. 2 with the check valve 128 and the bleed 124 positioned in housing section 75a rather than section 78a.

In the FIGS. 9 and 10 embodiment, the plunger rod 90a is positioned to be engaged by cam segment 66a to thereby effect movement of the rod 90'a in diaphragm 84a, which movement is transmitted through operator 100a to movable contact actuator 114a. The movable contact operator 114a actuates the movable contact 112a to effect periodic interruption and reactivation of the motor 14, as in the previous embodiments. In FIG. 9, the timer and wiper linkage is shown in the position it would assume during wiper cycling approaching the dwell period. Further movement of link 22 and crankarm 26 to the right, as seen in FIG. 9, will cause plunger 90a and diaphragm 84a to move to the right to effect opening of the timer switch. In FIG. 10, wiper operation has assumed the position where the cam 66a has caused the contacts 110a and 114a to open. In this position the parking switch 52 has not yet opened, the wiper is in its position remote from its parking position, and the wiper will continue to operate until it reaches its parking position where the cam 53 will open the parking switch 52, causing interruption of wiper operation. When the control bleed equalizes pressure on opposite sides of the diaphragm 84a sufficiently to permit the spring 91a to return diaphragm 84a to the position shown in FIG. 9, closing contacts 110a and 112a, the parking switch will be bypassed and another period of wiper cycling will begin. This operation will be repeated until the manual switch for operating the wiper motor is moved to either position "b" for continuous wiper operation or to the "off" position at "a."

It should now be apparent that a unique wiper system has been provided which enables a windshield wiper for a motor vehicle to be operated with a dwell period at the end of a wiping operation, the duration of which may be controlled by the motor vehicle operator and which is optionally usable. This improved intermittent dwell type wiper system is simple in construction and compact.

Certain specific embodiments of the invention have been described for the purpose of illustration, but it will be apparent that various modifications and other embodiments are possible within the scope of the invention. It is to be understood, therefore, that the invention is not limited to the specific arrangements shown, but in its broadest aspects, it includes all equivalent embodiments and modifications which come within the scope of the invention.

What is claimed is:

1. In a windshield wiper system on a motor vehicle for producing a dwell period following cyclic wiper operation comprising a wiper, an electric motor for driving said wiper and transmission means for transmitting motion to said wiper from said motor; a motor timer including a circuit interrupter for disconnecting said motor from its power source, an operator for said circuit interrupter operatively engageable with and actuated by said transmission means to effect disconnection of said motor from its power source, biasing means operatively engaging said operator to automatically effect reconnection of said motor with its power source and time delay means acting in opposition to said biasing means for controlling the duration of the period of motor circuit interruption.

2. In a windshield wiper system for a vehicle including an oscillating wiper and a power train for driving said wiper comprising a source of rotary motion and energy source for energizing said source of rotary motion, circuit means for connecting said energy source to said source of rotary motion and mechanical means including gear and linkage mechanism for transmitting the output from said source of rotary motion to said wiper and for converting said output to oscillatory motion; the combination comprising a cyclic timing device for periodically interrupting said power train operatively engageable with said mechanical means and actuated thereby to effect interruption of said power train, automatic means for reactivating said power train and pneumatically controlled time delay means acting on said cyclic timing device for controlling the time interval of power train interruption whereby cyclic wiper operation is automatically intermittently interrupted for a controlled period of time and automatically restarted.

3. In a windshield wiper system on a motor vehicle for producing a dwell period following cyclic wiper operation comprising a wiper, an electric motor for driving said wiper and transmission means for transmitting motion to said wiper from said motor; a motor timer including a circuit interrupter for disconnecting said motor from its power source, an operator for said circuit interrupter operatively engageable with and actuated by said transmission means to effect disconnection of said motor from its power source, biasing means operatively engaging said operator to automatically effect reconnection of said motor with its power source and pneumatically controlled time delay means acting in opposition to said biasing means for controlling the duration of the period of motor circuit interruption.

4. In a windshield wiper system on a motor vehicle for producing a dwell period following cyclic wiper operation comprising a wiper, an electric motor for driving said wiper and transmission means for transmitting motion to said wiper from said motor; a motor timer including a circuit interrupter for disconnecting said motor from its power source, an operator for said circuit interrupter operatively engageable with and actuated by said transmission means to effect disconnection of said motor from its power source, biasing means operatively engaging said operator to automatically effect reconnection of said motor with its power source and pneumatically controlled, adjustable time delay means acting in opposition to said biasing means for controlling the duration of the period of motor circuit interruption.

5. In a windshield wiper system for a vehicle including an oscillating wiper and a power train for driving said wiper comprising a source of rotary motion and energy source for energizing said source of rotary motion, circuit means for connecting said energy source to said source of rotary motion and mechanical means including gear and linkage mechanism for transmitting the output from said source of rotary motion to said wiper and for converting said output to oscillatory motion; the combination comprising a cyclic timing device for periodically interrupting said power train operatively engageable with said mechanical means and actuated thereby to effect interruption of said power train, automatic means for reactivating said power train, control means for rendering ineffective said cyclic timing device and pneumatically controlled time delay means acting on said cyclic timing device for controlling the time interval of power train interruption whereby either continuous or intermittent wiper operation may be effected.

6. In a windshield wiper system for a vehicle including an oscillating wiper and a power train for driving said wiper comprising a source of rotary motion and energy source for energizing said source of rotary motion, circuit means for connecting said energy source to said source of rotary motion and mechanical means including gear and linkage mechanism for transmitting the output from said source of rotary motion to said wiper and for converting said output to oscillatory motion; the combination comprising a cyclic timing device for periodically interrupting said power train, said cyclic timing device including an operator engageable with said gear mechanism and actuated thereby to interrupt said power train, biasing means acting on said operator to reactivate said power train and pneumatically controlled time delay means acting in opposition to said biasing means for controlling the duration of power train interruption.

7. In a windshield wiper system for a vehicle including an oscillating wiper and a power train for driving said wiper comprising a source of rotary moton and energy source for energizing said source of rotary motion, circuit means for connecting said energy source to said source of rotary motion and mechanical means including gear and linkage mechanism for transmitting the output from said source of rotary motion to said wiper and for converting said output to oscillatory motion; the combination comprising a cyclic timing device for periodically interrupting said power train including an operator engageable with said mechanical means and actuated thereby to effect interruption of said power train, automatic means for reactivating said power train, control means for rendering ineffective said cyclic timing device for providing continuous cyclic wiping, and time delay means responsive to actuation of said cyclic timing device for controlling the time interval of power train interruption.

8. In a windshield wiper system for a vehicle including an oscillating wiper and a power train for driving said wiper comprising a source of rotary motion and energy source for energizing said source of rotary motion, circuit means for connecting said energy source to said source of rotary motion and mechanical means including gear and linkage mechanism for transmitting the output from said source of rotary motion to said wiper and for converting said output to oscillatory motion; the combination comprising a cyclic timing device for periodically interrupting said power train, said cyclic timing device including an operator engageable with said mechanical means and actuated thereby to effect interruption of said power train, automatic means for reactivating said power train and time delay means energized in response to actuation of said cyclic timing device for controlling the time interval of power train interruption; and control means for rendering ineffective said cyclic timing device to provide continuous wiper cycling and for maintaining said operator out of engagement with said mechanical means during continuous wiper cycling.

9. In a windshield wiper system for a vehicle including an oscillating wiper and a power train for driving said wiper comprising a source of rotary motion and energy source for energizing said source of rotary motion, circuit means for connecting said energy source to said source of rotary motion and mechanical means including gear and linkage mechanism for transmitting the output from said source of rotary motion to said wiper and for converting said output to oscillatory motion; the combination comprising a cyclic timing device for periodically interrupting said power train, said cyclic timing device including an operator engageable with said mechanical means and actuated thereby to effect interruption of said power train, automatic means for reactivating said power train and time delay means energized in response to actuation of said cyclic timing device for controlling the time interval of power train interruption; control means for rendering ineffective said cyclic timing device to provide continuous wiper cycling and vacuum hold means for maintaining said operator out of engagement with said mechanical means.

10. In a windshield wiper system for a vehicle including an oscillating wiper and a power train for driving said wiper comprising a source of rotary motion and energy source for energizing said source of rotary motion, circuit means for connecting said energy source to said source of rotary motion and mechanical means including gear and linkage mechanism for transmitting the output from said source of rotary motion to said wiper and for converting said output to oscillatory motion; the combination comprising a cyclic timing device for periodically interrupting said power train, said cyclic timing device including an operator engageable with said mechanical means and actuated thereby to effect interruption of said power train, automatic means for reactivating said power train and time delay means energized in response to actuation of said cyclic timing device for controlling the time interval of power train interruption; control means for rendering ineffective said cyclic timing device to provide continuous wiper cycling and mechanical hold means for maintaining said operator out of engagement with said mechanical means during continuous operation.

11. A windshield wiper system for a motor vehicle for producing a dwell period following cyclic wiper operation comprising a rotary wiper motor, a gear mechanism driven by said motor, a source of electrical energy for energizing said motor, a network comprising a first circuit for connecting said motor to said source of electrical energy and a second circuit for connecting said motor to said source of electrical energy, a cyclic timing device comprising a circuit interrupter having a fixed contact and a movable contact and a timer control, said timer control including a housing proximate said gear mechanism, a movable wall dividing said housing into first and second compartments, a plunger secured to one side of said movable wall extending outwardly of said housing engageable with and actuated by said gear mechanism, a contact operator operatively secured to the other side of said movable wall for actuating said movable contact, resilient means in said first compartment biasing said movable wall in a direction to effect engagement of said plunger and said gear mechanism, check valve means in said housing for causing a pressure differential on opposite sides of said movable wall to oppose said resilient biasing means and controlled bleed means for reducing said pressure differential at a controlled rate, said fixed and movable contacts being included in said second circuit and switch means operable to selectively connect said motor to said source of electrical energy through said first or second circuits.

12. A wiper system according to claim 11 which includes control means connected to said controlled bleed for adjusting the bleed rate thereof.

13. A wiper system according to claim 11 in which said switch means includes hold means maintaining said plunger out of engagement with said gear mechanism when said motor is connected to said power source through said first circuit.

14. A wiper system according to claim 13 wherein said hold means comprises means for connecting said housing to a source of fluid pressure to actuate said movable wall and plunger.

15. A wiper system according to claim 13 wherein said hold means comprises a mechanically operated actuator operatively connected to said plunger for actuating said movable wall.

16. In a windshield wiper system for a vehicle including an oscillating wiper, driving means for said wiper, motion transmitting means for connecting said wiper to said driving means, an energy source energizing said driving means and control means for selectively connecting and disconnecting said energy source to said driving means; the combination comprising a cyclic timing device for periodically disconnecting and reconnecting said energy source with said driving means, said cyclic timing device including a reciprocating operator for actuating said cyclic timing device, cam means for actuating said reciprocating operator mounted on said motion transmitting means and engageable with said reciprocating operator, controllable time delay means for controlling said reciprocating operator to provide automatic intermittent wiper operation, and manual means for providing vehicle operator selection of intermittent or continuous wiper operation.

17. In a windshield wiper system for a vehicle including an oscillating wiper, driving means for said wiper, motion transmitting means for connecting said wiper to said driving means, an energy source energizing said driving means and control means for selectively connecting and disconnecting said energy source to said driving means; the combination comprising a cyclic timing device for periodically disconnecting and reconnecting said energy source with said driving means, said cyclic timing device including a reciprocating operator for actuating said cyclic timing device, said motor transmitting means including linkage for connecting the output of said driving means to said wiper, cam means mounted on said linkage and engageable with said reciprocating operator for actuating said reciprocating operator, pneumatically controlled time delay means for controlling said reciprocating operator to provide automatic remittent wiper operation.

18. In a windshield wiper system for a vehicle including an oscillating wiper, driving means for said wiper, motion transmitting means for connecting said wiper to said driving means, an energy source energizing said driving means and control means for selectively connecting and disconnecting said energy source to said driving means; the combination comprising a cyclic timing device for periodically disconnecting and reconnecting said energy source with said driving means, said cyclic timing device including a reciprocating operator for actuating said cyclic timing device, said motion transmitting means including an output shaft for said driving means, a pivot shaft for said wiper and linkage connecting said output shaft and said pivot shaft, cam means for actuating said reciprocating operator mounted on said motion transmitting means and engageable with said reciprocating operator, controllable pneumatic time delay means for controlling said reciprocating operator to provide automatic intermittent wiper operation and manual means for providing vehicle operator selection of intermittent or continuous wiper operation.

19. In a windshield wiper system, comprising a motor having output means for providing a rotary output, a wiper linkage for transmitting motion from said output means to said wiper; the combination comprising cyclic timing means for effecting automatic, periodic interruption of operation of said output means said cyclic timing means including plunger actuated interrupting means for interrupting operation of said output means, cam means mounted on said linkage, a reciprocal plunger engageable periodically with said cam means actuated thereby and operatively connected with said interrupting means to operate said interrupting means and time delay means for controlling the cyclic period of said reciprocating plunger to provide controlled intermittent wiper action.

20. In a windshield wiper system, comprising a motor having output means for providing a rotary output, a wiper linkage for transmitting motion from said output means to said wiper; the combination comprising cyclic timing means for effecting automatic, periodic interruption of operation of said output means said cyclic timing means including plunger actuated interrupting means for interrupting operation of said output means, cam means mounted on said linkage, a reciprocal plunger engageable periodically with said cam means actuated thereby and operatively connected with said interrupting means to operate said interrupting means, adjustable pneumatic time delay means for controlling the cyclic period of said reciprocable plunger to provide controlled intermittent wiper action and means for de-activating said interrupting means to instantaneously provide continuous wiper operation.

21. In a windshield wiper system, comprising a motor having output means for providing a rotary output, a wiper linkage for transmitting motion from said output means to said wiper; the combination comprising cyclic timing means for effecting automatic, periodic interruption of operation of said output means said cyclic timing means including plunger actuated interrupting means for interrupting operation of said output means, cam means mounted on said linkage, a plunger assembly comprising a plunger housing, a movable wall dividing said housing into a first compartment and a second compartment, a reciprocable plunger secured to said movable wall, mechanical biasing means for biasing said movable wall in a direction to cause said plunger to engage said cam means, valve means associated with one of said first and second compartments for effecting pneumatic time delay action opposing said spring biasing means, said reciprocable plunger being engageable periodically with said cam means, actuated thereby and operatively connected with said interrupting means, to operate said interrupting means and vehicle operator controlled selection means for de-activating said cyclic timing means to instantaneously provide continuous wiper operation.

References Cited in the file of this patent
UNITED STATES PATENTS

| | | |
|---|---|---|
| 2,343,656 | Folberth et al. | Mar. 7, 1944 |
| 2,987,747 | Oishei et al. | June 13, 1961 |
| 3,091,792 | Gute | June 4, 1963 |